United States Patent [19]

Uemachi et al.

[11] Patent Number: 5,413,883

[45] Date of Patent: May 9, 1995

[54] REVERSIBLE ELECTROCHEMICAL ELECTRODE

[75] Inventors: Hiroshi Uemachi, Osaka; Tadashi Sotomura, Kashiwara; Kenichi Takeyama, Osaka; Nobuyoshi Koshida, Kodaira, all of Japan

[73] Assignee: Matsushita Electric Industrial Co., Ltd., Osaka, Japan

[21] Appl. No.: 146,401

[22] Filed: Nov. 1, 1993

Related U.S. Application Data

[63] Continuation of Ser. No. 850,394, Mar. 11, 1992, abandoned.

[30] Foreign Application Priority Data

Mar. 11, 1991 [JP] Japan .................. 3-044735

[51] Int. Cl.$^6$ ............................................. H01M 4/60
[52] U.S. Cl. ................................. 429/213; 429/218; 252/500
[58] Field of Search ............. 429/213, 224, 218; 204/289, 291; 313/385; 359/263, 273; 350/357, 355; 252/500

[56] References Cited

U.S. PATENT DOCUMENTS

| | | | |
|---|---|---|---|
| 4,321,114 | 3/1982 | MacDiarmid et al. | 204/291 |
| 4,753,717 | 6/1988 | Yata et al. | 204/294 |
| 5,284,723 | 2/1994 | Hannecart et al. | 429/213 |

OTHER PUBLICATIONS

Yamamoto et al., *Polymer Battery*, 1991 (no month provided).

Primary Examiner—Kathryn Gorgos
Attorney, Agent, or Firm—Ratner & Prestia

[57] ABSTRACT

A reversible electrochemical electrode applicable for a battery, sensor, memory or display device is made by ion-implanting a conductive solid polymer such as polyaniline with ions of alkaline or alkaline earth metal. A wide variety of selections and combinations of materials of the conductive solid polymer and ion is possible. In addition, n-type doping is possible.

2 Claims, 1 Drawing Sheet

REVERSIBLE ELECTROCHEMICAL ELECTRODE

This application is a continuation of application Ser. No. 071850,394 filed Mar. 11, 1992, now abondoned.

BACKGROUND OF THE INVENTION

1. Field of the Invention

This invention relates to a reversible electrochemical electrode, applicable for electrochemical elements such as batteries, sensors, or display devices.

2. Description of the Prior Art

In recent years, net rechargeable batteries have been investigated, which have a negative electrode comprised of alkali metal, alkaline earth metal or a complex thereof and a positive electrode comprised of a conductive polymer.

When the battery, having the positive and negative electrodes arranged face to face in an electrolyte, is charged, cations of the electrolyte are deposited on the negative electrode and anions of the electrolyte are injected into the positive electrode (the positive electrode is doped). When the battery is discharged, the opposite reaction occurs. Thus, charging and discharging can be repeated reversibly. The positive electrode material which is capable of doping and dedoping with anions is made by electrolytic polymerization of pyrrole, thiophene, aniline or such heterocyclic compound, or a monomer of an aromatic compound.

As the negative electrode material, lithium is most commonly used, since the electromotive force of the unit cell thereof exceeds 3 V, and is practically favorable. However, lithium readily reacts with oxygen and humidity in the air and loses its activity, and, to prevent the contact of the electrode with the outer atmosphere, great caution has been exercised. For example, a material of polyacene or such pyropolymer, or graphite fluoride intercalated with lithium ions has been proposed.

The doping of the conductive solid polymer for the electrode material with ions is achieved by a chemical or electrochemical method. Whether the doping of the conductive polymer with cations or anions goes well depends on the interaction of the conductive polymer and dopant. In addition, the strength of the interaction is decided by the electrochemical potential or electron affinity.

With these methods, however, the dopant density has certain limits. For example according to *Denryoku-Chuo-Kenkyusho Hokoku* (Report of Central Laboratory on Electric Power of Japan), No. T89046, the doping of polyacene was only 4% for p-type material and 5.5% for n-type material at the most.

Also, most of the conductive polymer cannot be doped to n-type.

Even the conductive material capable of being doped to p-type to some extent, such as pyrrole or aniline for example, does not attain satisfactory performance as the cell.

SUMMARY OF THE INVENTION

It is an object of the present invention to provide a new reversible electrochemical electrode, for the combination of materials of the ion and solid electrode can be freely selected, and doping by implantation with n-type materials as well as p-type materials and a large amount of ions are possible, and which has excellent interaction between the ions and the conductive solid.

In order to solve the above mentioned problem, the electrochemical reversible electrode, according to an exemplary embodiment of the present invention, is made by doping with ions by an ion implantation process. Ion implantation refers to a technology whereby implant ions are accelerated by a high voltage of 10 kV to 1 MV into a solid body to change its various characteristics. This technology has been applied to the semiconductor field.

This technology is applicable to the formation of a new electrode, in accordance with an exemplary embodiment of the present invention.

DETAILED DESCRIPTION OF THE INVENTION

An exemplary embodiment of the present invention is explained below. The conductive solid material in the following description may be any solid material having electric conductivity such as conductive polymer, inorganic oxides etc.

Preparation of the Conductive Polymer

Polyaniline was made by chemical polymerization of aniline in acid solution with copper(II) borofluoride as the oxidizing agent, and was dedoped with ammonia. The polyaniline was dissolved into N-methyl-2-pyrrolidone, and the soluble part thereof was separated by centrifugation. The thus obtained soluble part was cast on a stainless-steel substrate, and dried to form thin-film polyaniline of about 20 $\mu$m thick.

Ion Implantation

Ion implantation is preferably done in an atmosphere of $10^{-10}$ Torr and by an accelerating voltage of such energy range as to not decompose the organic material, so that, in this case, the accelerating voltage was set at 10 kV. The ion-implanting equipment comprised an ion source, accelerating and converging system, deflecting and sweeping system, and target. The ion source was a direct-heating thermal-ion emitter consisting of platinum filament and lithium aluminosilicate. The ions emitted by the emitter were accelerated and converged at the front stage and again accelerated and converged at the second stage before penetrating into the deflecting system.

The beam deflection was made electrostatistically in two stages, and the implanted spot was settled (i.e. controlled) by the adjustment of the deflecting voltage. By superimposing an alternating voltage of triangular form on the deflecting voltage, sweeping of the $20 \times 20$ mm$^2$ range at the maximum is possible. The beam diameter at the target surface was about 1 mm, and the current density was $1 \sim 5$ $\mu$A/cm$^2$.

The target was grounded through a coulometer, and was surrounded by a Faraday cup. The polyaniline film prepared as described above was cut to 1 cm$^2$ square piece, painted with silver paste on the four corners of the lustrous surface, and was fixed on a substrate covered by Indium Tin Oxide (ITO) or yttrium oxide tin oxide film. The substrate was placed at the target part of the ion implanting equipment and the polyaniline film was implanted with lithium ions. The total amount of the implanted ions was measured with the coulometer.

The polyaniline film thus obtained had metallic luster on the implanted surface. Ions were implanted to the $6 \times 6$ mm$^2$ area with $1 \times 10^{-16}$ particles/cm$^2$ density.

Evaluation of the Electrode

Figure 1:
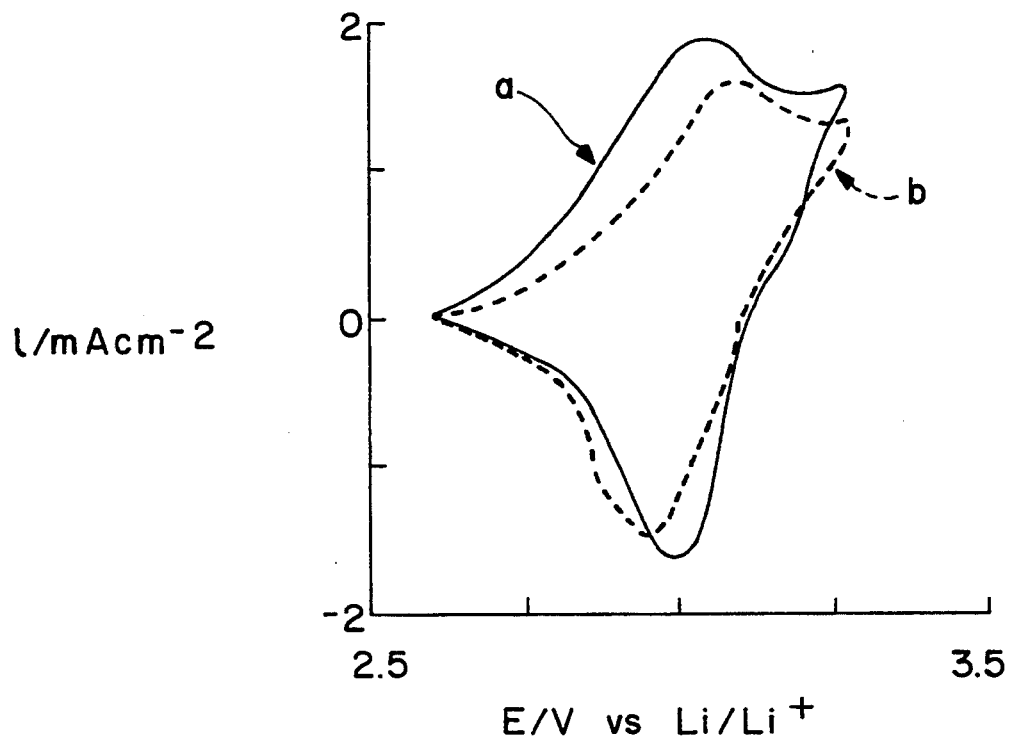
FIG. 1 is a diagram showing the current versus potential characteristics of a cell according to an exemplary embodiment of the present invention and conventional technology.

A cell A was assembled with the ion-implanted polyaniline film as the working electrode, metal lithium as the counter electrode, metal lithium also as the comparison electrode, and with an electrolyte of polypropylene carbide containing 1 Mol/1 of LiClO$_4$. Electrolysis was applied to the thus assembled cell with voltages raised and lowered with a sweeping rate of 40 mV/sec within the range of 2.6~3.3 V. In this manner, the current-voltage characteristic shown by the curve (a) of FIG. 1 was obtained. As a comparison, a cell B was arranged with a positive electrode of polyaniline without ion-implantation, and electrolysis was applied in a similar manner, to obtain the characteristics given by the curve (b).

It is observed that the difference of electric potential between the peaks of oxidation and reduction are about 60 mV for curve (a) and about 120 mV for curve (b), so that reversibility of lithium ions is improved for cell A over cell B.

Figure 2:
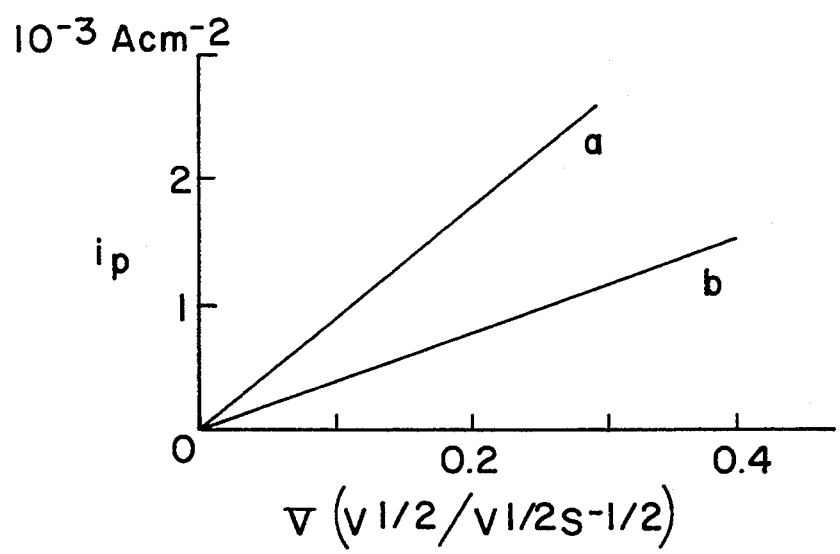
FIG. 2 a gram showing peak currents of oxidation against the square root values of potential-sweeping-speed of cells including an electrode according to an exemplary embodiment of the present invention and a conventional electrode.

Further, currents at the peaks of oxidation were measured at various speeds of potential sweeping. According to the theory of electrode reaction velocity, peak current of a electrode is proportional to the square root value of potential-sweeping-speed, and the steeper the curve the higher the electrode reaction velocity. Oxidation-peak-currents were plotted against the square root value of potential-sweeping-speed as shown in FIG. 2, in which line (c) is the plot for cell A, and line (d) that for cell B.

As is observed, line (c) is steeper than line (d), and the electrode reaction velocity of cell A is larger than that of cell B.

Thus, an electrode with large electrode-reaction-velocity and improved lithium-ion-reversibility was obtained.

According to the present invention, combinations of kinds of ions and the conductive solid materials is freely selected, and the amount of implanted ions is not limited, so that, not only p-type doping but n-type doping is possible. In addition, high density doping is possible.

Further, because the present invention does not adopt a chemical doping method, interaction between the ion and conductive solid is presumed different from that made by a conventional chemical method.

As described above, an electrode with improved reversibility of lithium ions is realized.

The conductive solid material and ion are not confined to the above described polyaniline and lithium, but as the conductive material, polypyrrole, polyparaphenylene, polyacetylene, polythiophene, polyacene etc., and as the ions to be implanted those of sodium, potassium, calcium etc. may be applicable.

According to the present invention, the ions and the conductive solid materials can be freely combined, and not only n-type doping is possible, but also conductive solid materials capable of being implanted to high ion-density may be used. Further, interaction between the ions and the conductive solid material (different from the conventional material) is obtained, and an electrode for which ions are taken in or out reversibly is possible.

What is claimed:

1. A reversible electrochemical electrode comprising a conductive solid material, said conductive solid material comprising at least one compound selected from the group consisting of ion implanted n-doped polyaniline and ion implanted n-doped polypyrrole.

2. The reversible electrochemical electrode of claim 1, wherein said conductive solid material includes ions selected from the group consisting of an alkali metal and an alkaline earth metal.

* * * * *